United States Patent [19]

Murray

[11] Patent Number: 5,094,905
[45] Date of Patent: Mar. 10, 1992

[54] STRUCTURAL ARTICLES MADE OF RECYCLED RUBBER FRAGMENTS FROM TIRES

[76] Inventor: Kevin N. Murray, P.O. Box 22, Foristell, Mo. 63348

[21] Appl. No.: 479,370

[22] Filed: Feb. 13, 1990

[51] Int. Cl.⁵ .............................................. B32B 9/00
[52] U.S. Cl. ................................ 428/218; 428/317.1; 428/903.3
[58] Field of Search ................. 428/903.3, 218, 317.1

[56] References Cited

U.S. PATENT DOCUMENTS 3,801,421 4/1974 Allen et al. .................... 428/903.3

Primary Examiner—Patrick J. Ryan
Assistant Examiner—Elizabeth Evans
Attorney, Agent, or Firm—Haverstock, Garrett and Roberts

[57] ABSTRACT

This invention relates to three dimensional members made from rubber fragments obtained from discarded tires. These items can be used as structural articles such as landscaping ties, dock bumpers for boat docks or truck loading docks, as resilient mats for workers or certain types of farm animals, or as substitutes for various products that are normally made of wood but which do not need to withstand large longitudinal loads. These articles are made by cutting, grinding, or shredding discarded tires into fragments. The fragments are mixed with an adhesive and molded, preferably under pressure, into a shape such as a rectangular beam. If desired for a particular use, these articles can be reinforced with strips of rubber or strands of fiber to give them greater tensile strength, or with reinforcing bars to give them added stiffness. If desired, they can be covered by a material such as plastic, impregnated cardboard, or a waterproof layer of adhesive.

15 Claims, 2 Drawing Sheets

STRUCTURAL ARTICLES MADE OF RECYCLED RUBBER FRAGMENTS FROM TIRES

FIELD OF THE INVENTION

This invention involves a use for rubber from discarded automobile tires, in structural articles such as landscaping ties and dock bumpers.

BACKGROUND OF THE INVENTION

It has been estimated that roughly 3 billion discarded tires from autombiles and trucks litter the American landscape, and 200 million more are discarded every year. Although some discarded tires are dumped offshore to create fishing reefs, that method of disposal is impractical for tires located long distances from coastlines. Most discarded tires sit in open dumps, where they collect rainwater and serve as breeding grounds for mosquitos, rats, and other pests. More information on various problems relating to the disposal or recycling of discarded tires is contained in the introductory section of U.S. Pat. No. 4,726,530 (Miller and Priscu 1988).

Various machines have been developed to cut, grind, or shred discarded tires into fragments. Such machines are disclosed in, e.g., U.S. Pat. Nos. 3,561,308 (Ehrlich 1971), 4,405,090 (Wakeem 1983), 4,422,581 (Chryst 1983), and 4,757,949 (Horton 1988).

More elaborate systems that can remove strands or pieces of steel, fiberglass, polyester, nylon, or other materials used in the reinforcing belts, so that the remaining purified rubber fragments can be chemically processed, are described in various other patents such as U.S. Pat. No. 4,726,530 (Miller and Priscu 1988) and U.S. Pat. No. 4,813,614 (Moore and Aten 1989). However, such additional processing tends to be relatively expensive.

Despite the availability of machinery for cutting, grinding, or shredding tires into fragments of any desired size, the fact remains that millions of discarded tires continue to pile up in open dumps, where they become eyesores and breeding grounds for pests. Prior to this invention, not enough practical and economical uses have been available for rubber fragments from discarded tires.

One object of the subject invention is to provide a use for rubber fragments obtained by cutting, shredding, or grinding discarded tires.

Another object of the invention is to provide a use for discarded tires which can utilize fragments of rubber without requiring expensive processing to remove strands of steel, fiberglass, polyester, nylon, or other reinforcing material from the rubber.

A third object of the subject invention is to provide a method of recycling discarded tires into products that will substitute for lumber in certain settings, thereby reducing the number of trees that must be cut down in order to provide products that people need.

A fourth object of this invention is to provide articles which people need, which are made from recycled waste products that have no other practical and economic market rather than from virgin timber or other resources which are in demand and whose depletion imposes a serious cost on the environment.

SUMMARY OF THE INVENTION

This invention relates to three dimensional members made from rubber fragments obtained from discarded tires. These items can be used as structural articles such as landscaping ties, dock bumpers for boat docks or truck loading docks, as resilient mats for workers or certain types of farm animals, or as substitutes for various products that are normally made of wood but which do not need to withstand large longitudinal loads. These articles are made by cutting, grinding, or shredding discarded tires into fragments. The fragments are mixed with an adhesive and molded, preferably under pressure, into a shape such as a rectangular beam. If desired for a particular use, these articles can be reinforced with strips of rubber or cords to give them greater tensile strength, or with reinforcing bars to give them added stiffness. If desired, they can be covered by a material such as plastic, impregnated cardboard, or a waterproof layer of adhesive.

DESCRIPTION OF THE PREFERRED EMBODIMENTS

Figure 1:
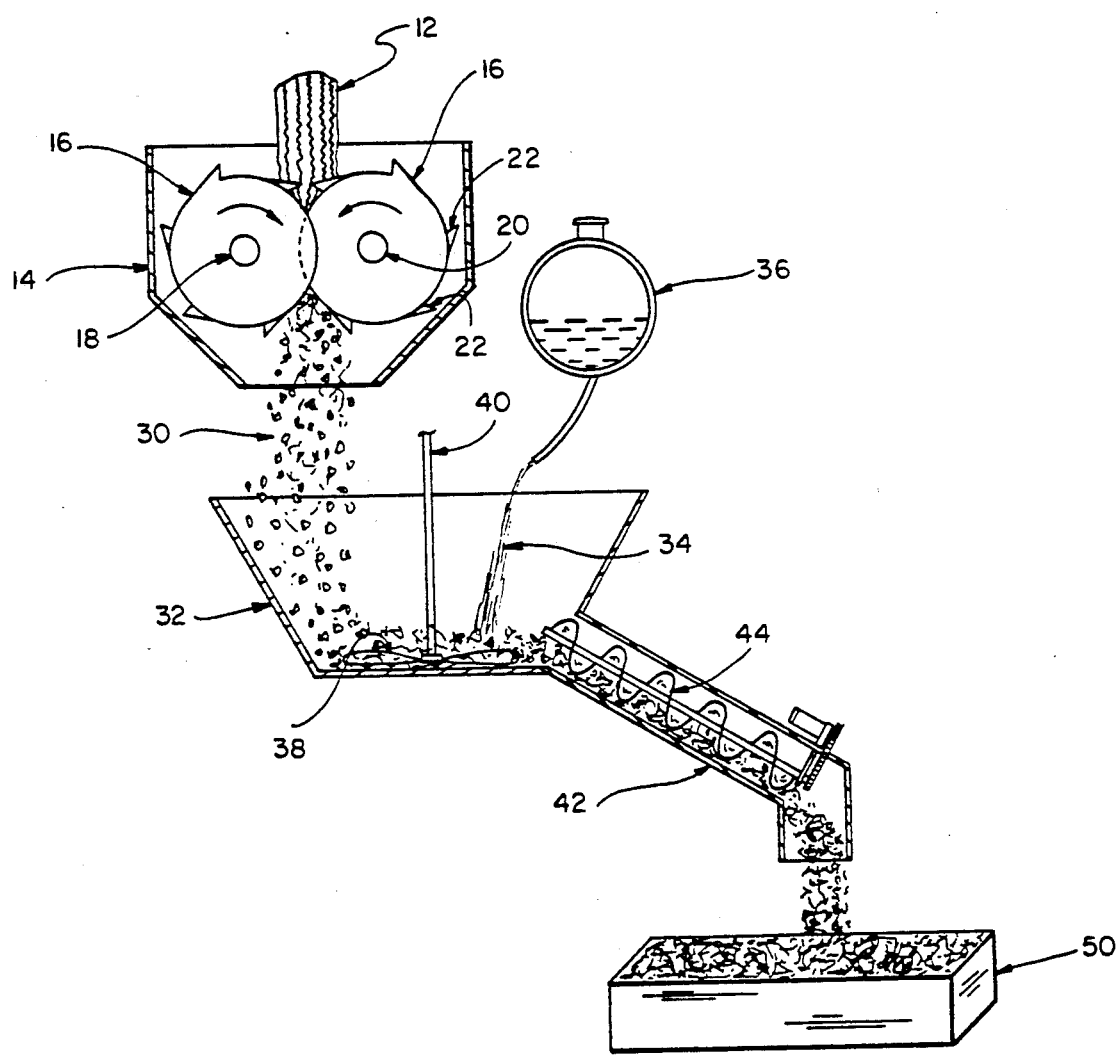
FIG. 1 is a schematic drawing of the machinery for carrying out the steps of the subject invention.
Figure 2:
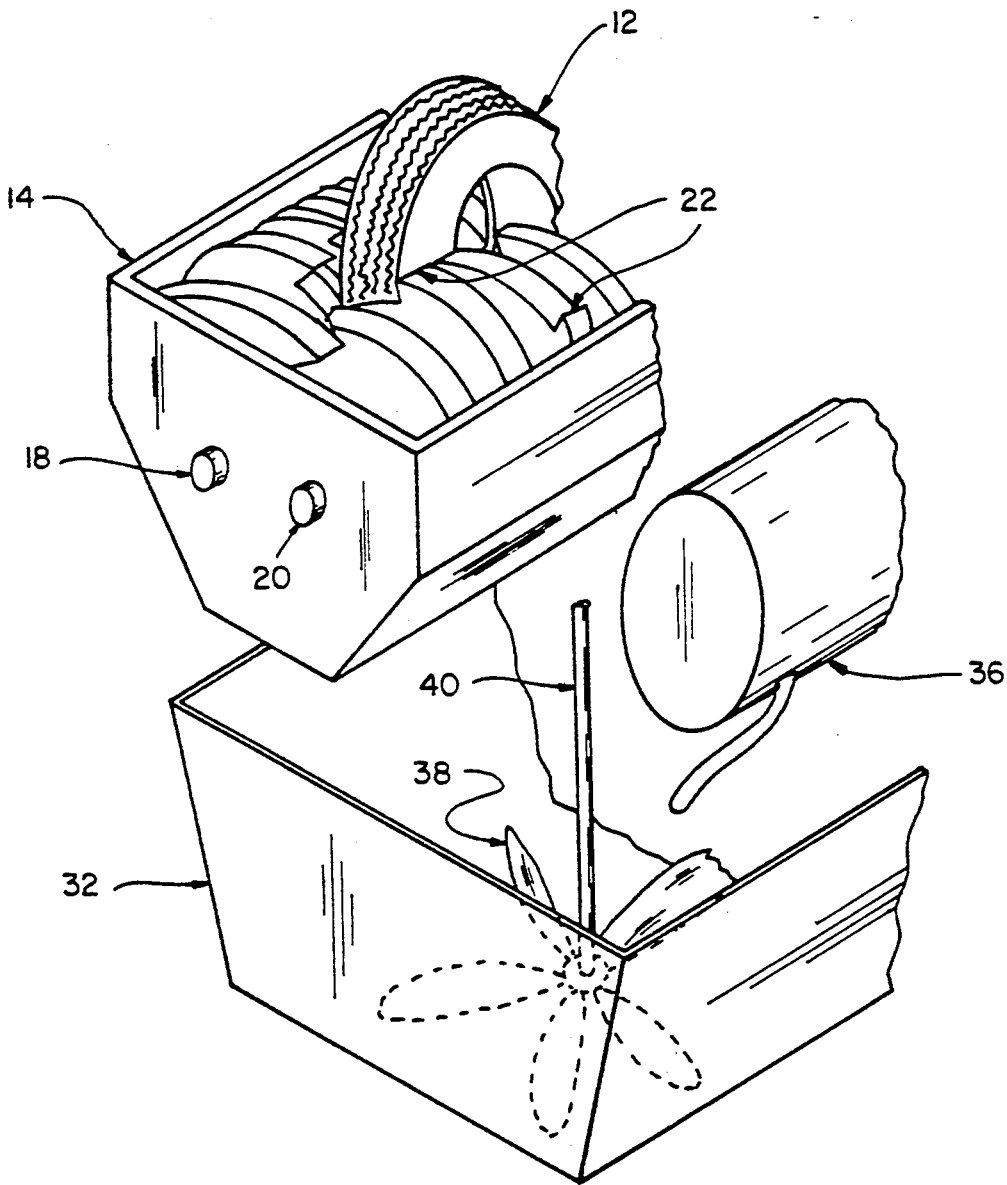
FIG. 2 is a perspective view of the grinding machine and mixing device of the subject invention.

In one preferred method for creating the articles of the subject invention, shown in FIG. 1, discarded tires 12 from automobiles, trucks, tractors, trailers, or any other type of vehicle which uses rubber tires are used as a raw material. Such vehicular tires need not be recently discarded; since tires are remarkably durable, discarded tires that have been sitting in dumps for years can be used if desired.

If necessary, foreign matter such as dirt can be removed using a hose and a spray nozzle with water, either by an operator or in a washing chamber. If desired, the tires (or the fragments obtained from the tires) can be further washed to remove grease and other contaminants that are not water soluble, using detergent, solvent, a diluted acid wash, or other suitable means. To minimize the cost of any such cleaning procedure, the tires can be divided into categories such as clean, slightly greased, and heavily greased. Each category can be treated appropriately.

Tires 12 are loaded into a cutting, grinding, or shredding machine 14, to convert the tires into fragments 30. A variety of suitable machines have been developed for this purpose, such as the machines described in U.S. Pat. Nos. 3,561,308 (Ehrlich 1971), 4,405,090 (Wakeem 1983), 4,422,581 (Chryst 1983), and 4,757,949 (Horton 1988). Shredding machine 14 as shown in FIG. 1 comprises a set of interacting rotating disks 16, mounted on axles 18 and 20, with blades 22 dispersed around the circumferences of disks 16, comparable to the rotating disk systems shown in U.S. Pat. Nos. 4,757,949 and 4,726,530. The rows of disks are rotated in opposite directions, so that they pull the tires 12 down between them.

If desired, the cutting process can be done in multiple stages. For example, a first cutting or shredding step can be used to cut the tires into sections or strips, or to shred the tires into large chunks having diameters of several inches. A second step can follow wherein the sections, strips, or chunks are shredded or ground into fragments. Using appropriate cutting, shredding, or grinding steps coupled with sorting devices (which usually involve sifting the chunks or fragments through metallic grates), the tires can be reduced to fragments 30 having any desired size range. In general, devices such as shredders or hammer mills are preferred for generating relatively large fragments (e.g., about ¾ inch in diameter or larger), while grinders may be preferred for generating relatively small fragments (e.g., less than about ¼ inch).

Various companies and contractors already run tire shredding machines. The rubber fragments used as described herein can be purchased from such a company, or they can be created on-site at the facility which makes the articles of this invention if the necessary machinery is available at that location.

A key feature of the subject invention is that the rubber fragments 30 do not need to be treated by a process to remove strands of steel, fiberglass, polyester, or nylon, which are commonly used to provide reinforcing belts in tires. Such purification, which is often necessary if the rubber will chemically recycled, is very expensive both in terms of equipment cost and processing costs. By avoiding the need for purifying the rubber, the subject invention makes it much more economical to convert discarded tires into useful, inexpensive items.

After the tires 12 have been fragmented into a suitable size range, the fragments 30 are loaded into a mixing bin 32. An adhesive 34 from a storage tank 36 is added to mixing bin 32, which mixes the fragments and adhesive together, coating the fragments with adhesive, using any suitable device such as paddles 38 which are mounted on rotating axle 40. Various other methods of mixing can be used if desired; for example, adhesive can be sprayed onto the fragments while the fragments lie on a shaker table. In general, the rubber fragments should be thoroughly coated with adhesive.

The mixture is then conveyed, using equipment such as a trough 42 equipped with an auger 44 if necessary, into a mold cavity 50 or compaction bin which has or which can assume a desired shape, such as a rectangular beam with dimensions between about four to ten inches square by about three feet long (for short landscaping ties) to about six feet long (for longer landscaping ties), or longer if needed for special purposes.

As used herein, "landscaping tie" is used broadly, to refer to beams used for various outdoor purposes, such as holding back dirt in sloped areas, lining driveways or roads, filling in trenches cut through concrete or asphalt driveways, or any other use that conventional wooden landscaping ties can be used for, so long as such uses do not impose large longitudinal loads or large bending forces on the rubber beams of this invention. Landscaping ties can have any reasonable length between about two and about ten feet, and they can have any desired cross-sectional shape, such as square, rectangular, rounded, or partially rounded.

Various types of adhesives have been developed which are used to bond rubber surfaces together. Such adhesives include polyester resins (sold by, e.g., Resin Technologies Group, Easton, Mass.), epoxies, urethanes, neoprenes, acrylics, or similar chemicals with numerous reactive side groups on polymeric molecules. Various solvent-based adhesives are also available, such as an adhesive sold under the label, "Fast Dry Self Vulcanizing Cement" by Patch Rubber Company (Roanoke Rapids, N.C.). These adhesives have a range of different characteristics. Some are relatively flexible, while others are stiff; some are quite viscous, while others can be sprayed. In general, the proper adhesive for any specific use will depend on the characteristics desired for that particular use. While the premium-grade, most expensive adhesives will provide the greatest durability under the widest range of conditions, less expensive adhesives may be adequate and therefore economically preferable for other uses. It is possible to dilute various types of adhesives, or to have them synthesized with altered chemical characteristics that make them less expensive. Any adhesive which bonds to rubber can be evaluated using routine experimentation to determine whether it has adequate strength and durability for any specific type of structural article within the scope of this invention. Just as lumber stores sell different types and grades of wood for different uses, a retail or wholesale outlet which sells the structural articles of this invention can sell different grades of articles, rated and priced according to the type, quality, and durability of the adhesive used.

The adhesive should be thoroughly mixed with the rubber fragments before the article is molded and allowed to set, to avoid the creation of non-adhering seams that might run through the article and weaken it. With the adhesive tested so far (the Fast Drying Self Vulcanizing cement sold by Patch Rubber Company) a mix of about one part adhesive to four parts rubber (by volume) provides adequate bonding. That ratio is in accord with recommendations made by adhesive specialists. However, it may vary for certain types of adhesives, and for articles having varying overall sizes or fragment size ranges. The preferred adhesive-to-rubber ratio for any specific use can be optimized through routine experimentation.

After the fragments have been mixed with the adhesive, the mixture is placed inside a mold, such as a three-walled trough with square corners. In one preferred embodiment, pressure is applied to the top and/or sides of the mold. Such pressure serves several purposes: (1) it ensures that the entire mold cavity is filled, to eliminate or minimize undesired vacancies or air pockets that can result when a highly viscous and sticky mixture is poured into a mold; (2) it reduces the porosity and permeability of the resulting article, making it more solid and durable; (3) it forces the fragments of rubber into closer contact with the adhesive, thereby increasing the bonded surface area and the tightness of the adhesive bonds. However, such compacting pressures preferably should not generate excessive compression forces that would substantially deform the fragments, since substantially deformed rubber fragments would tend to try to return to their original unstressed shapes after the compaction pressure is released, which would generate undesired stress levels inside the article. In prototype experiments using irregularly shaped tire cuttings and a self-vulcanizing solvent-based adhesive, a compaction pressure in the range of 500 to 1500 pounds per square inch was used with satisfactory results. Optimal compaction pressures can be determined through routine experimentation for articles having different overall sizes, different fragment shapes or size ranges, different types of adhesive, or to provide different grades of articles having different levels of durability.

In alternate preferred embodiments, compaction pressure may not be required if relatively high volumes of adhesive are used. For example, a high ratio of adhesive-to-rubber can be used to create an article of this invention having high density and virtually no pore space or permeability to water. When thoroughly mixed, the rubber fragments and adhesive will generate a slurry with no air pockets rather than a porous mixture. That type of slurry may not need to be placed under pressure in order to ensure maximal contact between the rubber particles and the adhesive. However, even in such situations, pressure can be applied to ensure that the entire mold cavity is filled.

If desired, a device such as a table press can be used to mold a number of articles of this invention simultaneously. For example, a rectangular table having an array of rectangular mold cavities can be used to create a plurality of beams in a single molding step.

If desired, the inside of a mold cavity can be coated with a layer of material such as plastic, or an anti-stick substance such as a thin layer of grease or a silicon spray, before the mold is filled with a mixture of rubber and adhesive. Alternately or additionally, the interior surfaces of the mold can be made of a polished or smooth metal such as stainless steel. Any of those techniques will minimize sticking of the shaped articles to the mold, and will simplify the removal of the article from the mold.

In another preferred embodiment, a structural article of this invention can be made having one or more layers (such as an envelope layer which covers the entire surface) with varying ratios of rubber to adhesive. For example, to make a buoyant article of this invention, such as a floating boat dock or floating platform for a lake or pond, a bottom layer can be provided with an adhesive content high enough to make it totally impermeable to water. The center portion can have a lower adhesive content, which will lead to higher porosity and lower density; the center portion can also be made of irregularly shaped rubber fragments or cuttings, which will further increase the pore space and reduce the density of the center portion compared to rounded or cubed fragments. The top portion can an impermeable layer with a high adhesive content, and after the three layers are removed from the mold, the sides can be sealed with a layer of adhesive or by various other means. Conversely, to make an article that is relatively stiff but which has a flexible, resilient exterior, the center portion would have a high adhesive content and be made of rounded or cubed fragments, while one or both outer layers would have a lower adhesive content and/or irregularly shaped fragments or cuttings.

If desired, the article can be enclosed within a suitable material, such as a layer of plastic or cardboard impregnated with plastic, or a layer of adhesive. Such layers can reduce the quantities of adhesive needed to keep the rubber fragments together in a cohesive and durable article. The covering layer can be watertight, or it can comprise a mesh material or a cover with drainage holes, depending on the intended use for the article and its probable exposure to water or other liquids and to freezing temperatures.

If desired, the rubber fragments can be mixed with rubber strips or other flexible reinforcing cords. Such strips or cords can provide additional reinforcement to withstand high tensile stresses, which can be useful if the article has one dimension substantially larger or longer than the other dimensions (such as landscaping ties).

In addition or alternately, the articles of this invention can be constructed around reinforcing metal bars, such as the typical rough-surfaced steel reinforcing bars used to reinforce concrete. Reinforcing bars would allow these articles to be used for purposes that require stiffness, such as fence posts.

The articles of this invention will have a significant degree of resiliency, which is advantageous for many uses. For example, structural articles made of rubber fragments from discarded tires can be used as dock bumpers in either boat docks or truck loading docks.

In addition, resilient mats that are made as described herein can be used for various cushioning purposes. As one example, they can be used to cushion the floor at workstations where people must stand for prolonged periods in one place. As another example, various farm animals such as cows and horses dislike standing for prolonged periods on concrete or other hard surfaces; various leg problems or a drop in milk production can result if they are forced to do so. Resilient mats made according to this invention can be provided for their stalls to avoid such problems. "Mat" is used herein in its conventional sense, to refer to an article which is relatively flat and which is usually, but not necessarily, placed on the ground.

Thus, there has been described herein a class of structural articles, and a method for constructing such articles, which satisfies all of the objectives set forth above, and which provides a useful and inexpensive way to recycle a major type of solid waste while reducing the need to cut down trees. Although this invention has been described with respect to certain specific embodiments, those skilled in the art will recognize that various alterations and modifications may be made to those embodiments without departing from the scope and spirit of this invention. Such equivalents are within the scope of this invention, which is limited only by the claims that follow.

What is claimed is:

1. A landscaping tie constructed of rubber fragments mixed with an adhesive and bonded together, the rubber fragments being produced by fragmenting at least one tire containing rubber and strands of reinforcing material used to reinforce the tire, wherein a sufficient quantity of adhesive is mixed with the rubber to create a free-standing material having structural integrity, said landscaping tie formed under pressure in a mold having the desired shape for a time period sufficient for the adhesive to set.

2. The landscaping tie of claim 1, wherein the adhesive is selected from the group consisting of polyester resins, epoxies, urethanes, neoprenes, acrylics, and solvent-based adhesives.

3. The landscaping tie of claim 1, wherein the rubber fragments are blended with the adhesive in a ratio of four parts rubber fragments to at least about one part adhesive, by volume.

4. The landscaping tie of claim 1, wherein the rubber fragments mixed with the adhesive are enclosed within an external layer of non-permeable waterproofing material.

5. The landscaping tie of claim 1, containing elongated strips of rubber incorporated therein to provide reinforcement against tensile stresses.

6. The landscaping tie of claim 1, containing elongated fibrous material incorporated therein to provide reinforcement against tensile stresses.

7. A dock bumper constructed of rubber fragments mixed with an adhesive and bonded together, the rubber fragments being produced by fragmenting at least one tire containing rubber and strands of reinforcing material used to reinforce the tire, wherein a sufficient quantity of adhesive is mixed with the rubber to create a free-standing article having structural integrity, said dock bumper formed under pressure in a mold having the desired shape for a time period sufficient for the adhesive to set.

8. The dock bumper of claim 7, wherein the adhesive is selected from the group consisting of polyester resins, epoxies, urethanes, neoprenes, acrylics, and solvent-based adhesives.

9. The dock bumper of claim 7, wherein the rubber fragments are blended with the adhesive in a ratio of four parts rubber fragments to at least about one part adhesive, by volume.

10. The dock bumper of claim 7, wherein the rubber fragments mixed with the adhesive are enclosed within an external layer of non-permeable waterproofing material.

11. The dock bumper of claim 7, containing elongated strips of rubber incorporated therein to provide reinforcement against tensile stresses.

12. The dock bumper of claim 7, containing elongated fibrous material incorporated therein to provide reinforcement against tensile stresses.

13. The dock bumper of claim 7, comprising an interior portion which has a lower density than an exterior portion, wherein the dock bumper is buoyant in water.

14. The dock bumper of claim 13, wherein the interior portion has a lower volume fraction of adhesive than the exterior portion.

15. The dock bumper of claim 13, wherein the interior portion comprises rubber fragments having irregular non-spherical shapes.

* * * * *

UNITED STATES PATENT AND TRADEMARK OFFICE
CERTIFICATE OF CORRECTION

PATENT NO. : 5,094,905

DATED : March 10, 1992

INVENTOR(S) : Kevin N. Murray

It is certified that error appears in the above-identified patent and that said Letters Patent is hereby corrected as shown below:

Col. 6, line 40, delete "material" and substitute therefor --article--.

Signed and Sealed this

Eighteenth Day of May, 1993

Attest:

MICHAEL K. KIRK

Attesting Officer

Acting Commissioner of Patents and Trademarks